United States Patent
Lin et al.

(10) Patent No.: US 7,921,455 B2
(45) Date of Patent: *Apr. 5, 2011

(54) TOKEN DEVICE THAT GENERATES AND DISPLAYS ONE-TIME PASSWORDS AND THAT COUPLES TO A COMPUTER FOR INPUTTING OR RECEIVING DATA FOR GENERATING AND OUTPUTTING ONE-TIME PASSWORDS AND OTHER FUNCTIONS

(75) Inventors: Paul Lin, Fremont, CA (US); Henry Hon, Berkeley, CA (US)

(73) Assignee: Authenex, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/398,887

(22) Filed: Mar. 5, 2009

(65) Prior Publication Data
US 2010/0064360 A1 Mar. 11, 2010

Related U.S. Application Data

(63) Continuation of application No. 10/891,598, filed on Jul. 15, 2004, now Pat. No. 7,519,989.

(60) Provisional application No. 60/488,585, filed on Jul. 17, 2003.

(51) Int. Cl.
- *G06F 7/04* (2006.01)
- *G06F 21/00* (2006.01)
- *G06F 11/30* (2006.01)
- *H04L 9/32* (2006.01)
- *H04B 7/24* (2006.01)
- *H04N 17/00* (2006.01)
- *G06F 1/00* (2006.01)
- *G06F 21/20* (2006.01)
- *H04L 9/00* (2006.01)
- *G06K 19/00* (2006.01)

(52) U.S. Cl. .............. 726/9; 726/20; 713/172; 713/174; 713/182; 702/186; 455/39

(58) Field of Classification Search ................ 726/9, 20; 713/172, 174, 182; 702/186; 455/39
See application file for complete search history.

(56) References Cited

U.S. PATENT DOCUMENTS 4,599,489 A  7/1986  Cargile
(Continued)

FOREIGN PATENT DOCUMENTS

EP  0 2341 00  9/1987
(Continued)

OTHER PUBLICATIONS

Kolodgy, Charles;"Identity Management in a Virtual World Whitepaper"; IDC; Aladdin Knowledge Systems, Jun. 2003, pp. 1-12.*
(Continued)

*Primary Examiner* — Matthew B Smithers
*Assistant Examiner* — Courtney D Fields
(74) *Attorney, Agent, or Firm* — Stevens Law Group; David R. Stevens

(57) ABSTRACT

A token device that generates and displays one-time passwords and couples to a computer for inputting or receiving data for generating and outputting one-time passwords and performing other functions is provided. The token includes an interface for coupling to a computer. The token may also be coupled to any network that the computer may be connected to, when coupled to the computer. Data and information may be transmitted between the computer and token, and between the network and token, via the computer and interface. The data and information may include one-time password seeding, file transfer, authentication, configuration and programming of the token. The token must be seeded to generate and display one-time passwords. An original, or seed, value is loaded into the token. One-time passwords are subsequently generated or calculated, or both, from the seed value. Seeding of the token involving a counter, time, or time-related functions, may allow synchronization of the token with such functions. The token may support different authentication methods.

21 Claims, 2 Drawing Sheets

U.S. PATENT DOCUMENTS

| | | | |
|---|---|---|---|
| 4,609,777 | A | 9/1986 | Cargile |
| 4,720,860 | A | 1/1988 | Weiss |
| 4,800,590 | A | 1/1989 | Vaughan |
| 4,819,267 | A | 4/1989 | Cargile et al. |
| 5,280,527 | A | 1/1994 | Gullman |
| 5,361,062 | A | 11/1994 | Weiss |
| 5,657,388 | A | 8/1997 | Weiss |
| 5,802,176 | A | 9/1998 | Audebert |
| 5,887,065 | A | 3/1999 | Audebert |
| 5,937,068 | A | 8/1999 | Audebert |
| 6,671,808 | B1 | 12/2003 | Abbott |
| 6,748,541 | B1 | 6/2004 | Margalit |
| 6,990,433 | B1 * | 1/2006 | McCutcheon ............... 702/186 |
| 7,272,723 | B1 | 9/2007 | Abbott |
| 7,519,989 | B2 | 4/2009 | Lin |
| 2001/0054148 | A1 | 12/2001 | Hoornaert |
| 2002/0046169 | A1 | 4/2002 | Keresman, III et al. |
| 2002/0099665 | A1 | 7/2002 | Burger |
| 2002/0129285 | A1 | 9/2002 | Kuwata et al. |
| 2002/0194499 | A1 | 12/2002 | Audebert et al. |
| 2003/0084304 | A1 | 5/2003 | Hon |
| 2003/0087601 | A1 * | 5/2003 | Agam et al. ............... 455/39 |
| 2003/0212894 | A1 | 11/2003 | Buck |
| 2004/0215966 | A1 * | 10/2004 | Elteto ........................ 713/182 |

FOREIGN PATENT DOCUMENTS

| | | | |
|---|---|---|---|
| EP | 1 001 329 | | 5/2000 |
| EP | 1933252 A1 * | | 6/2008 |
| WO | WO/00/42491 | | 7/2000 |
| WO | WO/00/75755 | | 12/2000 |
| WO | WO01/084768 | | 8/2001 |
| WO | WO/03/069476 | | 8/2003 |

OTHER PUBLICATIONS

U.S. Appl. No. 60/183,640, filed Feb. 18, 2000, Frank Hoornaert.
U.S. Appl. No. 60/116,006, filed Jan. 15, 1999, Shawn D. Abbott.
U.S. Appl. No. 09/281,017, filed Mar. 30, 1999, Shawn D. Abbott.
U.S. Appl. No. 60/466,096, filed Apr. 28, 2003, Laszlo Elteto.
U.S. Appl. No. 60/488,585, filed Jul. 17, 2003, Paul Lin.
Authentications From Passwords to Public Keys: Richard E. Smith.
Feb. 11, 2004. Aladdin Knowledge Systems to Unveil World's First Ever USB Smartcard Token with One-Time Password Functionality.
eToken NG with One-Time Password (OTP).
Vasco Sep. 1, 2000 MaxiKey.
The Universal Bus Specification, revision 1.0, dated Jan. 15, 1996 http://fl.hw.cz/docs/usb/usb10doc.pdf.
The Universal Bus Specification, revision 1.1, dated Sep. 23, 1998 http://esd.cs.ucr.edu/webres/usb11.pdf.
The Universal Bus Specification, revision 2.0, dated Apr. 27, 2000 http://read.pudn.com/downloads47/ebook/160102/USB%20Spec20.pdf.
RSA SecurID ComboReader I.
RSA SecurID ComboReader 6100.

* cited by examiner

TOKEN DEVICE THAT GENERATES AND DISPLAYS ONE-TIME PASSWORDS AND THAT COUPLES TO A COMPUTER FOR INPUTTING OR RECEIVING DATA FOR GENERATING AND OUTPUTTING ONE-TIME PASSWORDS AND OTHER FUNCTIONS

CROSS-REFERENCE TO RELATED APPLICATIONS

This application is a non-provisional application of Provisional Application No. 60/488,585, filed on Jul. 17, 2003.

BACKGROUND OF THE INVENTION

1. Field of the Invention

The present invention relates to data authentication methods and systems and, more particularly, to a token device that generates and displays one-time passwords and couples to a computer for inputting or receiving data for generating and outputting one-time passwords and performing other functions.

2. Background Information

The role of computers in our society has grown dramatically over the last few decades. During the past decade, networking technology and the Internet have grown and matured. The Internet is fast becoming the primary platform for global communication and commerce. However, the ease of communication and information sharing that has driven the growth of the Internet has also made it more difficult to ensure the security of Internet transactions and to maintain the privacy of information accessible over the Internet.

To maintain security and privacy, many transactions and communications taking place over the Internet and other networked environments require that a user authenticate him or herself in order to access information or to conduct transactions. For example, an online brokerage typically requires a user to authenticate him or herself prior to accessing their account or trading stocks.

Authentication refers to the method of proving the identity of the user. To be authenticated, the user typically presents a unique credential to a website or network they desire to access. This credential is usually comprised of a username and a secret password. Both the username and secret password may be established by the user. Alternatively, the username may be assigned to the user by an administrator of the website, or a similar entity, and the user may generate their secret password. Other known alternative methods may also be used to generate the username and password.

Static usernames and passwords are the most common method of authentication in the networked environment. However, static usernames and passwords are prone to several types of attacks and impersonations such as "Trojan horses" and "dictionary attacks." A user's static username and password can also be misappropriated through networking sniffers, password hacking programs, and other less sophisticated methods such as guesswork. For example, a user may have established a "weak" password using his date of birth or the name of his spouse as the password which may be easily guessed.

To strengthen authentication methods and prevent the types of attacks and impersonations described above, the network security industry has develop methods of authentication that go beyond simple username and password schemes. These methods may be categorized as challenge and response, Public Key Infrastructure or PKI, and One-Time Password or OTP. These methods make impersonation attacks more difficult by creating longer and dynamic passwords. Longer passwords make it more difficult to guess the password, while dynamic passwords allow the authorized user to use the same username, but a new password each time.

Each new password is generated by hardware or software commonly referred to as a token device, or "token". The token may be designed to display dynamic passwords. When authentication is needed, the user simply enters the dynamic password displayed by the token at that time. These token values are often supplemented with a secret PIN code know only to the user. A secret PIN code may also be used to activate the token in order to display the dynamic password. These authentication methods have the potential to replace simple username and password schemes in the future.

BRIEF SUMMARY OF THE INVENTION

The present invention comprises a token device that generates and displays one-time passwords. The token device, hereinafter token, couples to a computer for inputting or receiving data for generating and outputting one-time passwords and performing other functions.

The token includes an interface for coupling to a computer. The token may be coupled to any network that the computer may be connected to. Data may be transmitted between the computer and token and between the network and token, via the computer and interface when the token is coupled to the computer and when the computer is connected to the network.

The data may include one-time password seeding, authentication, token configuration, programming of the token, and file transfer. The token may be multi-functional and capable of generating and displaying one-time passwords as well as performing other functions, such as challenge and response, PKI, digital certificate, and/or biometric.

The token must first be seeded to generate and display one-time passwords. Seeding is the process of loading an original, or seed, value into a token. From the seed value one-time passwords are subsequently generated or calculated, or both. There are many ways to load seed values into the token.

The token can be seeded when it is coupled to a computer via the interface. For example, seed values can be loaded into the token from the computer via the interface. Seed values may also be sent to the token from a network that the computer is connected to. The seed values may be encrypted or in clear text. The seed values may also be generated, derived and/or calculated from PKI keys pairs and/or digital certificates. Some methods of seeding involve a counter, time, or time-related functions. In these cases, when the token is coupled to a computer, it may allow synchronization operations to synchronize the token with such counter, time, or time related functions.

The token may support a single authentication method or a combination of different authentication methods. These authentication methods include one-time password, challenge response, PKI, digital certificate, and/or biometric. The token may also perform such functions while coupled with a computer and thus to a network that the computer is connected to.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

Figure 1:
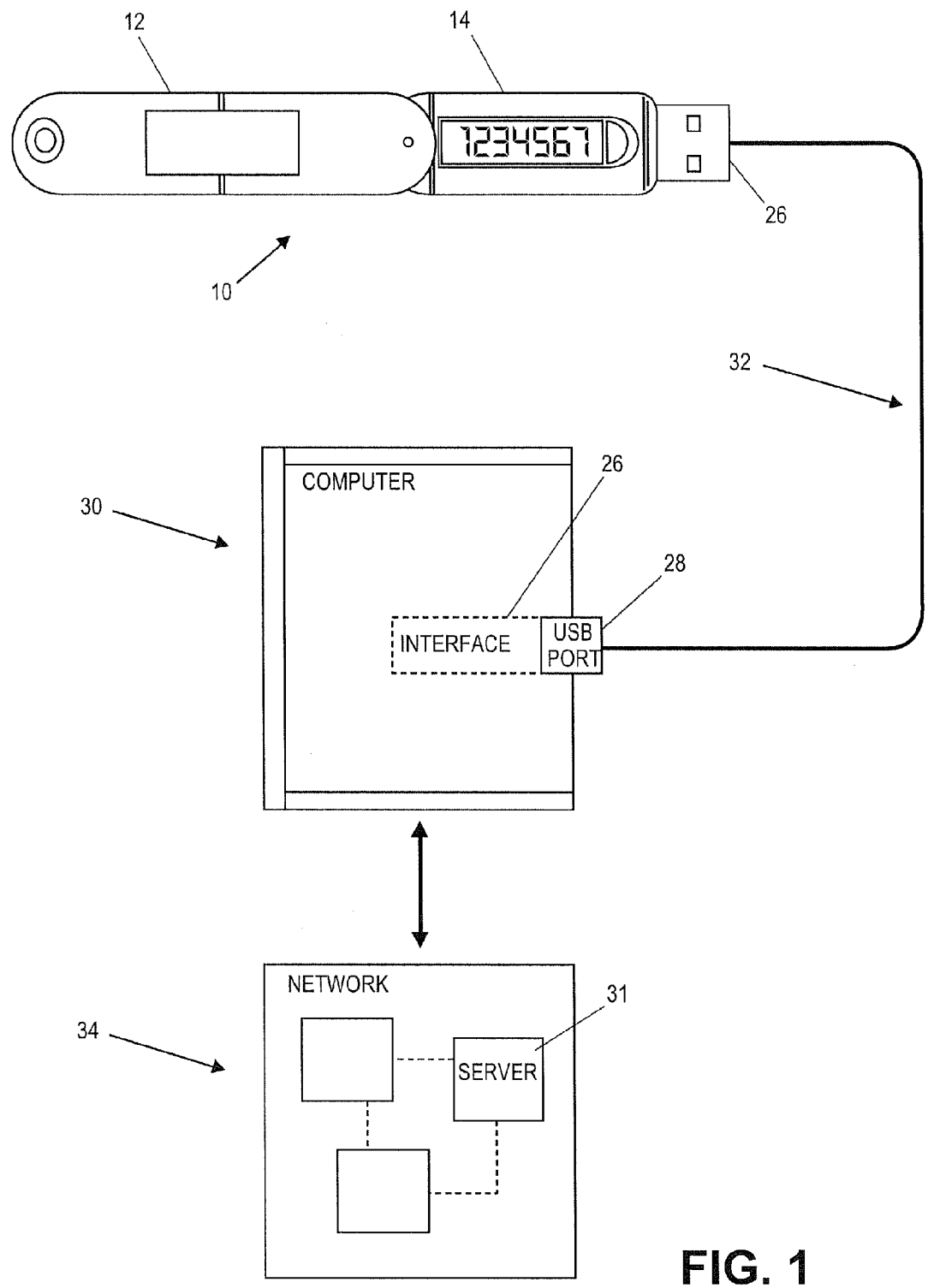
FIG. 1 is a schematic diagram showing an embodiment of the token device of the present invention coupled to a computer and showing the computer coupled to a computer network.
Figure 2:
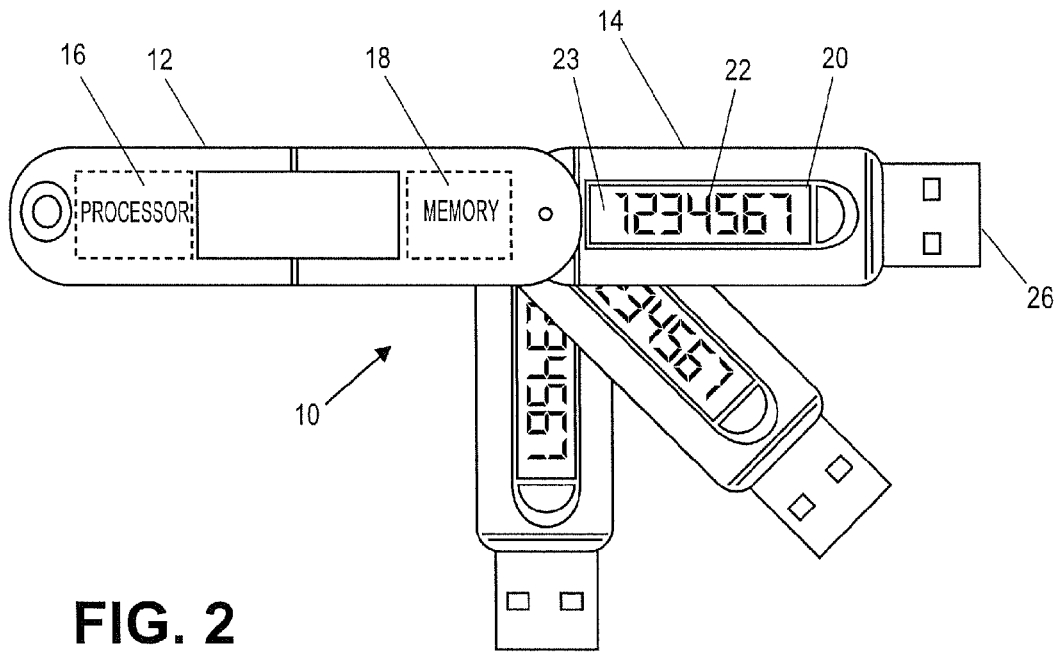
FIG. 2 is a top, schematic view of a preferred embodiment of a token device of the invention showing a display portion rotatably coupled to a body portion of the token device invention.
Figure 3:
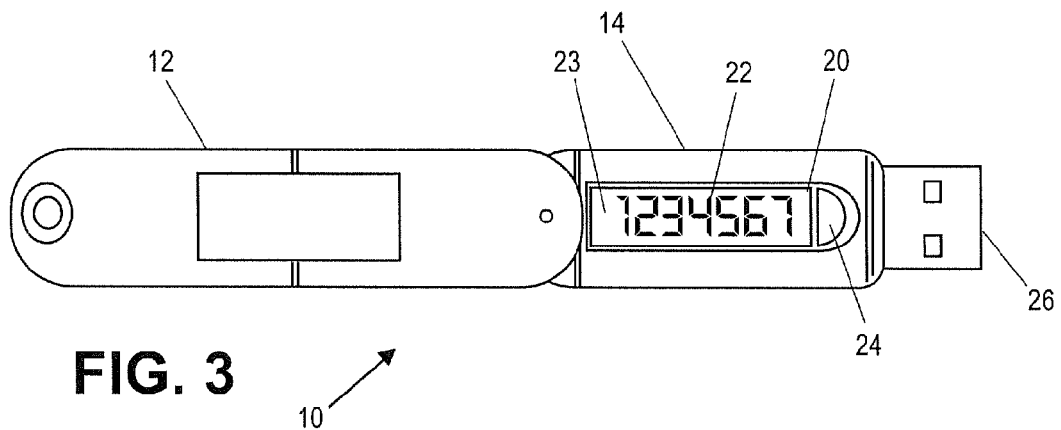
FIG. 3 is a top, schematic view of a preferred embodiment of the token device of the invention.
Figure 4:
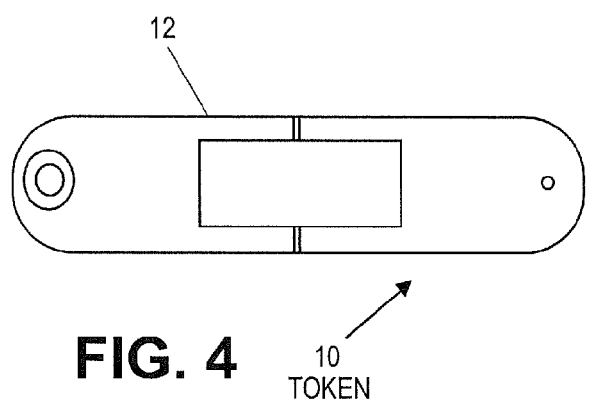
FIG. 4 is a top, schematic view showing token device of the invention in a closed position.

Referring to the drawing in FIGS. 1-4, the invention comprises a token device, or token, shown generally at 10. The token includes a body portion 12 and a display portion 14. The display portion may optionally be pivotally, rotatably, or similarly coupled to the body portion 12.

An on-board processor 16 and memory 18 for processing and storing data may be contained in the body portion 12. The processor 16 is preferably capable of generating and outputting data that may be utilized as one-time passwords. The one-time passwords output by the processor 16 may be displayed on a display 20 of the display portion 14.

A one-time password output by the processor 16 may comprise a string of alphanumeric characters. Preferably, the string of alphanumeric characters ranges from six to eight characters.

The token 10 may be provided with a unique string of information, or data, for identifying that particular token 10. The unique string of information may be stored in the token's memory 18. A copy of the unique string of information may reside at a remote location, such as a server 31 of a network 34.

The display portion 14 includes a display 20. The display 20 preferably comprises either a Liquid Crystal Display (LCD) or Light Emitting Diode (LED) display that is electronically coupled to the processor 16 using known methods. The display 20 is preferably capable of displaying a plurality of numeric or alphanumeric characters, shown generally at 22 that can be viewed through a window 23. The display portion 14 may be rotatably coupled to the body portion 12. Rotatably coupling the display portion 14 to the body portion 12 may help to prevent damage to the display 20 and may provide a token 10 having reduced dimensions.

The display portion 14 includes an interface 26 for coupling the token 10 to a data port 28 of a computer, shown generally at 30. The interface 26 may be provided in any suitable known data interface configuration. Preferably, the interface 26 is provided in a known Universal Serial Bus (USB) configuration for coupling to a known USB port 28 of the computer 30 via a USB data cable 32. Additionally, the computer 30 may be coupled to a computer network 34, such as the Internet. Thus, data may be transmitted between the token 10 and computer 30, via the data cable 32, and data may be transmitted between the token 10 and network 34, via the data cable 32 and computer 30. Alternatively, the token 10 may optionally function externally of the network 34 and without coupling to the computer 30.

The display portion 14 may further include an activation button 24. The activation button 24 may be provided for activating the display 20, to limit power consumption or increase the life of the display 20, for example.

The token 10 is capable of receiving, generating, and outputting data and information. This data and information may include one-time password seeding, file transfer, authentication, configuration and programming of the token 10. The multi-functional token 10 is capable of generating and displaying one-time passwords as well as performing other functions.

The token 10 must first be seeded to generate and display one-time passwords. Seeding is the process of loading an original, or seed, data value into the token 10. From the seed value one-time passwords are subsequently generated or calculated, or both. There are many ways to load seed data values into the token 10.

One preferred method of seeding the token 10 includes first coupling the token 10 to the computer 30 via the data cable 32. The seed data values are then sent to the token 10 and stored in memory 18 and processed by the token's processor 16. Alternatively, seed values are then sent to the token 10 from a server 31 of the network 34 via the computer 30 and data cable 32. There are a number of known methods for transmitting and loading seed values into the token 10 that are readily apparent to those of ordinary skill in the art.

The seed data values may, or may not, be encrypted. The seed values may also be generated, derived and/or calculated from PKI keys pairs and/or digital certificates. Some methods of seeding the token 10 involve a counter, time, or time-related functions. In these cases, when the token 10 is coupled to the computer 30, it may allow synchronization operations to synchronize the token 10 with such counter, time or time related functions.

The token 10 may support a single authentication method or a combination of different authentication methods. These methods include one-time password, challenge response, PKI, digital certificate, and/or biometric. The token 10 may also perform such functions while coupled with the computer 30 and thus to any network 34 that the computer 30 is connected to.

Thus, there has been described a token device that generates and displays one-time passwords and couples to a computer for inputting or receiving data for generating and outputting one-time passwords and performing other functions. The token may also be coupled to any network that the computer may be connected to, when coupled to the computer. Data and information may be transmitted between the computer and token, and between the network and token, via the computer and interface. The data and information may include one-time password seeding, file transfer, authentication, configuration and programming of the token.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A unitized USB token device for generating and displaying one-time passwords comprising:

a processor configured to generate one-time passwords;
a memory configured to store digital data;
a seed value stored in memory for use by the processor in generating one-time passwords;
a display for displaying characters;
an interface for coupling the token to a computer;
a USB interface for coupling the unitized USB token device to a computer; and
a housing configured to hold the seed value, the display and the USB interface.

2. The token device of claim 1 wherein the display displays characters including one of the group of numeric characters, alphanumeric characters and a combination of letters and numbers, where the characters represent one-time passwords generated by the token device.

3. A unitized USB token device for generating and displaying one-time passwords comprising:
a body portion, the body portion including, a processor for processing data;
a memory for storing data including a seed value used in generating one-time passwords, the memory coupled to the processor;
a display included with the body portion for displaying one of alphanumeric and numeric characters, the display coupled to the processor for displaying data output by the processor in the form of one-time passwords; and
an interface for coupling the token to a computer, for transmitting data between the processor and computer.

4. The token device of claim 3 wherein the display displays one of alphanumeric and numeric characters representing one-time passwords output by the processor.

5. The token device of claim 4 wherein the display is configured to display at least five characters including one of letters and numbers representing password data output by the processor.

6. The token device of claim 3 wherein the processor generates new one-time passwords at predetermined time intervals.

7. The token device of claim 3 wherein the processor generates a new one-time password upon receipt of data from the computer, and wherein the new one-time password is displayed on the display.

8. A unitized USB token device for generating and displaying one-time passwords comprising:
a seed value for generating one-time passwords;
a display for displaying numeric characters;
a USB interface for coupling the token device to a computer; and
a housing configured to hold the seed value, the display and the USB interface.

9. A unitized USB token device according to claim 8, where in the characters further include alphanumeric characters.

10. A unitized USB token device according to claim 8, where in the housing is made up of at least two separate and distinct portions.

11. A unitized USB token device for generating and displaying one-time passwords, comprising:
a processor configured to generate one-time passwords;
a memory configured to store a seed value for use by the processor in generating one-time passwords;
a display for displaying one-time passwords in the form of numeric characters;
a USB interface configured to communicate with a computer; and
a housing configured to hold the display, the processor, the memory, the display, the USB interface and the seed value as a unitized USB token device.

12. The unitized USB token device of claim 1, wherein the processor is further configured to generate or modify the seed value by at least one of the methods including PKI keys pairs, digital certificates, and time related functions.

13. The unitized USB token device of claim 1, wherein said device additionally performs other functions selected by at least one of the methods including challenge and response, PKI, and digital certificate.

14. The unitized USB token device of claim 11, wherein the processor is further configured to generate or modify the seed value by at least one of the methods including PKI keys pairs, digital certificates, and time related functions.

15. The unitized USB token device of claim 11, wherein said device additionally performs other functions selected by at least one of the methods including challenge and response, PKI, and digital certificate.

16. A unitized USB token device for generating and displaying one-time passwords, comprising:
a processor configured to generate one-time passwords;
a memory configured to store a seed value for use by the processor in generating one-time passwords;
a display for displaying one-time passwords in the form of alphanumeric characters;
a USB interface configured to communicate with a computer; and
a housing configured to hold the display, the processor, the memory, the display, the USB interface and the seed value as a unitized USB token device.

17. The unitized USB token device of claim 16, wherein the display is configured to display one-time passwords in the form of numeric characters.

18. The unitized USB token device of claim 16, wherein the display is configured to display one-time passwords in the form of numeric characters only.

19. The unitized USB token device of claim 16, wherein the display is configured to display one-time passwords in the form of alphanumeric characters only.

20. The unitized USB token device of claim 16, wherein the processor is further configured to generate or modify the seed value by at least one of the methods including PKI keys pairs, digital certificates, and time related functions.

21. The unitized USB token device of claim 16, wherein said device additionally performs other functions selected by at least one of the methods including challenge and response, PKI, and digital certificate.

* * * * *

UNITED STATES PATENT AND TRADEMARK OFFICE
CERTIFICATE OF CORRECTION

| | | |
|---|---|---|
| PATENT NO. | : 7,921,455 B2 | Page 1 of 1 |
| APPLICATION NO. | : 12/398887 | |
| DATED | : April 5, 2011 | |
| INVENTOR(S) | : Paul Lin | |

It is certified that error appears in the above-identified patent and that said Letters Patent is hereby corrected as shown below:

Column 5

--;line 6, "an interface for coupling the token to a computer;" should be deleted Column 6

--;line 14, "by" should be changed to --from--

--;line 17, "by" should be changed to --from--

--;line 22, "by" should be changed to --from--

--;line 25, "by" should be changed to --from--

--;line 51, "by" should be changed to --from--

--;line 54, "by" should be changed to --from--

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,921,455 B2 | Page 1 of 1 |
| APPLICATION NO. | : 12/398887 | |
| DATED | : April 5, 2011 | |
| INVENTOR(S) | : Paul Lin | |

It is certified that error appears in the above-identified patent and that said Letters Patent is hereby corrected as shown below:

Column 6 line 11, "the display" should be deleted

Signed and Sealed this
Fourteenth Day of June, 2011

David J. Kappos
*Director of the United States Patent and Trademark Office*